(12) United States Patent
Hayslett et al.

(10) Patent No.: US 9,637,197 B2
(45) Date of Patent: May 2, 2017

(54) DYNAMIC INERTIA COMPENSATION AND PEDAL EFFORT TRANSFORMATION FOR ELECTRIC BIKE

(71) Applicant: GM Global Technology Operations LLC, Detroit, MI (US)

(72) Inventors: Steven L. Hayslett, Troy, MI (US); Goro Tamai, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/789,379

(22) Filed: Jul. 1, 2015

(65) Prior Publication Data
US 2017/0001682 A1    Jan. 5, 2017

(51) Int. Cl.
*B62M 6/50* (2010.01)
*B60L 11/00* (2006.01)

(52) U.S. Cl.
CPC .............. *B62M 6/50* (2013.01); *B60L 11/007* (2013.01); *A63B 2220/54* (2013.01)

(58) Field of Classification Search
CPC ............ B62M 6/40–6/75; B62M 23/02; B60L 11/007; A61B 5/222; A63B 2220/54
See application file for complete search history.

(56) References Cited

U.S. PATENT DOCUMENTS

| 3,921,745 | A | * | 11/1975 | McCulloch | B60L 7/12 180/206.1 |
| 5,370,200 | A | * | 12/1994 | Takata | B60L 3/0092 180/206.4 |
| 5,375,676 | A | * | 12/1994 | Takata | B62M 6/55 180/206.2 |
| 5,474,148 | A | * | 12/1995 | Takata | B62M 6/45 180/206.2 |

(Continued)

FOREIGN PATENT DOCUMENTS

| DE | 19732430 A1 * | 2/1999 | .......... B60L 11/1801 |
| DE | 19855585 A1 * | 6/2000 | .............. B62M 6/60 |

(Continued)

OTHER PUBLICATIONS

EPO machine translation of DE 19855585 (original DE document published Jun. 8, 2000).*

(Continued)

*Primary Examiner* — Redhwan k Mawari
*Assistant Examiner* — David Testardi
(74) *Attorney, Agent, or Firm* — BrooksGroup (57) ABSTRACT

A number of variations may include a product comprising: an electric cycle powertrain comprising: a motor; at least one gear set operatively connected to the motor; a chain ring operatively connected to the at least one gear set and a chain; a rear sprocket operatively connected to the chain ring and a rear hub; a crank operatively connected to the chain ring and a first pedal assembly and a second pedal assembly; at (Continued)

least one controller and at least one sensor, wherein the at least one controller is constructed and arranged to process one or more signals from the at least one sensor to apply a torque to the motor to compensate for inertial and spin loss associated with the electric cycle powertrain.

19 Claims, 5 Drawing Sheets

(56) References Cited

U.S. PATENT DOCUMENTS

| | | | | |
|---|---|---|---|---|
| 5,922,035 | A * | 7/1999 | Chen | B62M 6/45 180/206.2 |
| 5,971,090 | A * | 10/1999 | Tanaka | B60L 11/1801 180/206.2 |
| 6,296,072 | B1 * | 10/2001 | Turner | B62M 6/55 180/206.2 |
| 2012/0166105 | A1 * | 6/2012 | Biermann | A63B 24/0062 702/43 |
| 2012/0241264 | A1 * | 9/2012 | Hosaka | B60L 7/14 188/156 |
| 2013/0205916 | A1 * | 8/2013 | Kodama | A63B 24/0062 73/862.69 |
| 2014/0039741 | A1 * | 2/2014 | Tanaka | B60L 11/007 701/22 |
| 2015/0136509 | A1 * | 5/2015 | Tanaka | B62M 6/50 180/206.3 |

FOREIGN PATENT DOCUMENTS

| | | | |
|---|---|---|---|
| EP | 926059 A2 | * | 6/1999 |
| EP | 2604499 A1 | * | 6/2013 |
| EP | 2860096 A1 | * | 4/2015 |
| JP | 04321479 A | * | 11/1992 |
| JP | 08275583 A | * | 10/1996 |

OTHER PUBLICATIONS

Reddy, M.Rama Narasimha et al., "Design & Fabrication of Shaft Drive for Bicycle", International Journal of Emerging Engineering Research and Technology, vol. 2, Issue 2, May 2014, pp. 43-49.*
Wikipedia article, "Powertrain", Old revision dated Apr. 5, 2015, 2 pages.*
Spinnetti, Ramondo. "Backward versus forward pedaling: Comparison tests." 1987. Bicycle Science. Human Power 6, No. 3:1, 10-12.
Okajima, Shinpei. "Desinging Chainwheels to Optimize the Human Engine." 1983. Bicycle Science. Bike Tech, No. 4:1-7.

* cited by examiner

DYNAMIC INERTIA COMPENSATION AND PEDAL EFFORT TRANSFORMATION FOR ELECTRIC BIKE

TECHNICAL FIELD

The field to which the disclosure generally relates to includes electric cycles having pedal force-based propulsion systems.

SUMMARY OF ILLUSTRATIVE VARIATIONS

A number of variations may include a product comprising: an electric cycle powertrain comprising: a motor; at least one gear set operatively connected to the motor; a chain ring operatively connected to the at least one gear set and a chain; a rear sprocket operatively connected to the chain ring and a rear hub; a crank operatively connected to the chain ring and a first pedal assembly and a second pedal assembly; at least one controller and at least one sensor, wherein the at least one controller is constructed and arranged to process one or more signals from the at least one sensor to apply a torque to the motor to compensate for inertial and spin loss associated with the electric cycle powertrain.

A number of variations may include a method to compensate for inertial and spin losses associated with an electric cycle powertrain comprising: using at least one sensor and a controller to estimate inertial and spin losses of an electric cycle powertrain and a pedal effort torque, and multiplying the pedal effort torque by a gain to get a torque average; using the controller to determine a torque command to compensate for the inertial and the spin losses of the electric cycle powertrain using the estimate of the inertial and the spin losses of the electric cycle powertrain and the torque average; and applying the torque command to the motor using the controller.

A number of variations may include a method to compensate for inertial and spin losses associated with an electric cycle powertrain comprising: using at least one sensor and a controller to determine a speed of a motor, a power of the motor, a first temperature of the motor, a second temperature of at least one gear set, an acceleration of the motor, a system inertia, a position of a crankshaft, a cadence, a torque of the crankshaft, a periodic pedal input, and a gear ratio; using the controller to estimate a spin loss torque of the motor using the speed of the motor, the power of the motor, and the first temperature of the motor; using the controller to estimate a loaded gear loss torque using the speed of the motor, the power of the motor, the first temperature of the motor, and the second temperature of the at least one gear set; using the controller to estimate an inertial torque of the motor and the at least one gear set using the acceleration of the motor and the system inertia; using the controller comprising summing the spin loss torque of the motor, the loaded gear loss torque, and the inertial torque of the motor and the at least one gear set; using the controller to transform the periodic pedal input into a non-periodic pedal effort using at least one of the position of the crankshaft, the cadence, or the torque of the crankshaft; applying a gain to the non-periodic pedal effort to determine an average torque using the controller; using the controller to determine whether the cadence multiplied by the gear ratio is approximately equal to the speed of the motor; using the controller to determine whether the non-periodic pedal effort is greater than the cadence if the cadence multiplied by the gear ratio is approximately equal to the speed of the motor; using the controller to determine a torque command based on the spin loss torque of the motor, the loaded gear loss torque, and the inertial torque of the motor and the at least one gear set, if the non-periodic pedal effort is greater than the cadence; and using the controller to send the torque command to the motor.

A number of variations may include a method to compensate for inertial and spin losses of an electric cycle powertrain comprising: using at least one sensor and a controller to determine a position of a crank and a torque of the crank; using the controller to determine a periodic function based on a relationship of the position of the crank and the torque of the crank; assigning an absolute value to the periodic function using the controller; using the controller to determine a non-periodic pedal effort torque by dividing the torque of the crank by the absolute value of the periodic function; using the controller to determine a torque command using the non-periodic pedal effort torque; and using the controller to apply the torque command to a motor to compensate for inertial and spin losses of the electric cycle.

A number of variations may include a method to compensate for inertial and spin losses associated with an electric cycle powertrain comprising: using at least one sensor and a controller to determine a position of a crank, a speed of the crank, and a torque of the crank; using the controller to determine a transformation coefficient by inputting the position of the crank and the speed of the crank into a transformation coefficient lookup table; and using the controller to determine a non-periodic pedal effort by multiplying the transformation coefficient by the torque of the crank.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
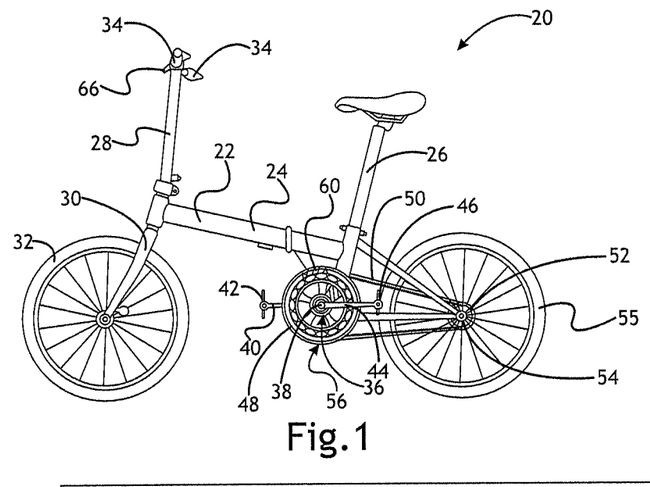
FIG. 1 illustrates a side view of an electric cycle according to a number of variations.

FIG. 1 illustrates a number of variations which may include an electric cycle 20. In a number of variations, the electric cycle 20 may include a frame 22 which may include a top tube 24 connected to a seat tube 26. A steerer tube 28 may extend from the top tube 24. The steerer tube 28 may be operatively connected to a front fork 30 which may be attached to a front wheel 32. Handlebars 34 may be attached to the steerer tube 28 and may be used to control the direction of the front wheel 32 by way of the front fork 30. The electric cycle 20 may include a crank assembly 36 which may include a crankshaft 38 having a first pedal assembly 40 and a second pedal assembly 44 connected thereto. The first pedal assembly 40 may include a first foot pedal 42, and the second pedal assembly 44 may include a second foot pedal 46. A chain ring or sprocket 48 may be operatively connected to the crankshaft 38 for driving a chain 50 operatively connected to a rear sprocket 52 which may be operatively connected to a rear hub 54 of a rear wheel 55. A motor/generator 56 may be operatively attached to the crankshaft 38. Any number of motors/generators may be used including, but not limited to, a brushless in runner ring motor. The motor 56 may include a stator 70 and a rotor 72. The rotor 72 may rotate within the stator 70, which may be grounded, and may include an electromagnet. The motor 56 may be powered by any number of battery assemblies (not illustrated). The rotor 72, in any of a number of variations, may be ring shaped and may include one or more permanent magnets which may rotate or spin within the rotor 72. The rotor 72 may be constructed and arranged to float inside of the stator 70. A controller 60, may be used to vary the speed, direction, and/or braking of the motor/generator 56. In a number of variations, the controller 60 may switch the polarity of each pole, each time a magnet on the rotor 72 passes the pole on the stator 70. When the polarity is switched, the magnet is attracted to the next pole and may repel the last pole which it passed. This may cause the rotor 72 to rotate within the stator 70. This process is repeated for the duration that power is supplied to the motor/generator 56 which may drive the motor/generator 56. The electric cycle powertrain 68 may also include one or more mechanical mechanisms 62, 64 which may be operatively connected to various elements of the electric cycle powertrain 68 to control the various elements which may include, but are not limited to, the first and second pedal assemblies 40, 44, the crank assembly 36, the rear hub 54, and/or the chain ring 48.

The electric cycle 20 may be a bicycle, tricycle, or four-wheel electric cycle having a crank assembly constructed and arranged to allow a rider to provide input thereto using the first pedal assembly and the second pedal assembly.

In a number of variations, the electric cycle 20 may be constructed and arranged to allow a rider to rotate the first and second pedal assembly 40, 44 in a full clockwise or counter clockwise rotation to power the electric cycle 20 or may allow a rider to use a pedal force-based propulsion system wherein the first and second pedal assemblies 40, 44 may be fixed in an approximately horizontal position so that a rider may provide intuitive input commands by applying a force to a first foot pedal 42 or a second foot pedal 46 in the clockwise or counter clockwise direction. The input commands may be intuitive to the rider and may be similar to riding a non-motorize cycle wherein the rider applies a clockwise force to a cycle crankshaft by applying force to a forward positioned foot pedal to move the cycle in a forward direction, and the rider applies a counter clockwise force to the cycle crankshaft by applying force to a rearward positioned foot pedal to slow the cycle.

Reference herein as to clockwise or counter-clockwise is made with respect to the right hand side of the electric cycle 20 with an operator facing the forward direction of movement of the electric cycle 20.

Figure 3:
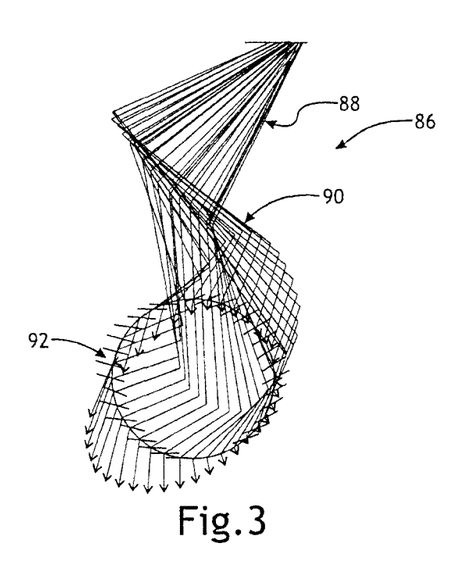
FIG. 3 illustrates a pedal force pattern according to a number of variations.
Figure 5:
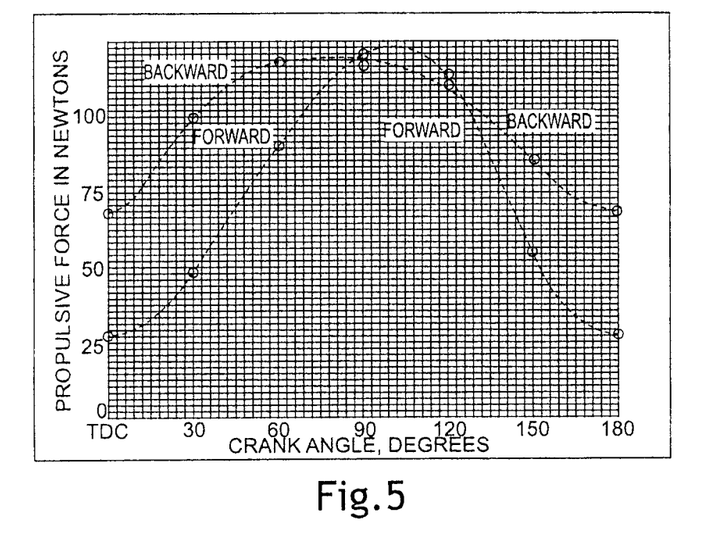
FIG. 5 illustrates a graph of a static propulsive force versus crank angle for forward and backward pedaling of a cycle without an electric powertrain according to a number of variations.

FIG. 3 illustrates a typical pedal-force pattern 86 of a cycle without an electric powertrain courtesy of Okajima, Shinpei. (1983). "Designing chainwheels to optimize the human engine." *Bike Tech* 2, no. 4:1-7. The pedal-force pattern 86 illustrates the force exerted by the thigh 88, lower leg 90, and foot 92 during typical pedaling of the cycle. FIG. 5 illustrates a static propulsive force versus crank angle for forward and backward pedaling of a cycle without an electric powertrain courtesy of Spinnetti, Ramondo. (1987). "Backward versus forward pedaling: Comparison tests." *Human Power* 6, no. 3:1, 10-12. The forces required to pedal a cycle may be increased when the cycle includes an electric powertrain 68, as the rider may need to further pedal through inertial and spin losses which may be associated with the electric powertrain 68. This may be noticeable to a rider when the assist levels of the electric cycle 20 are low or when the electric cycle 20 may be operating without assist. In a number of variations, an electric cycle powertrain 68 may include an inertial and spin loss compensation system 58 which may estimate the inertial and spin losses associated with the electric powertrain 68 and/or may perform a pedal effort transformation to determine a torque to be applied to the motor 56 to compensate for the inertial and spin losses of the electric powertrain 68 so that the rider may experience a more natural pedal feel.

Figure 2:
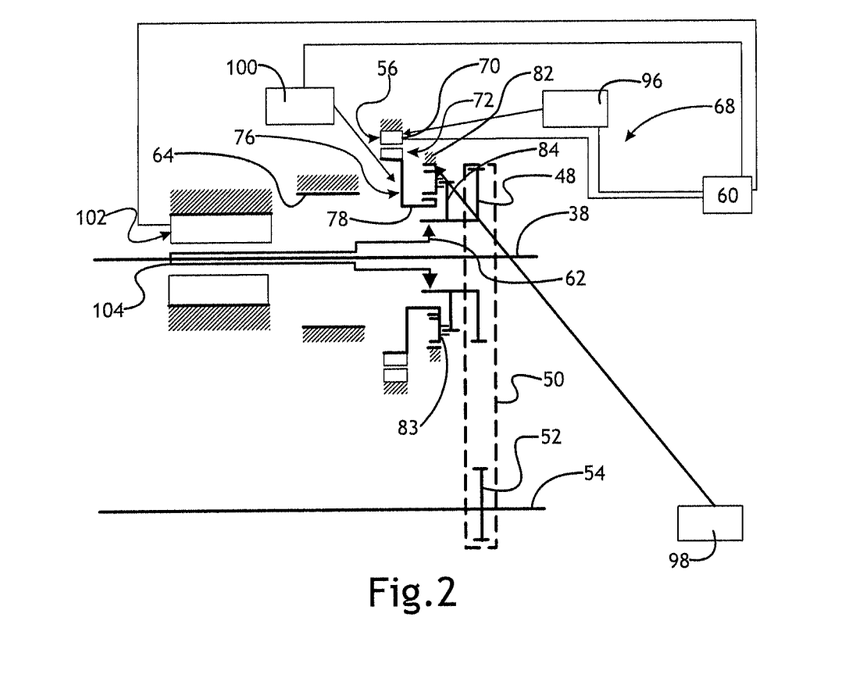
FIG. 2 illustrates a schematic of an electric cycle powertrain according to a number of variations.

In a number of variations, an inertial and spin loss compensation system 58 may include one or more controllers 60 and one or more sensors 96, 98, 100, 102 which may be operatively connected to the electric cycle powertrain 68. The at least one controller 60 may include one or more control algorithms, lookup tables, or signal processing techniques to calculate a torque command 150, 162, which may be used to compensate for any inertial and spin losses associated with the electric powertrain 68, which may then be sent to the motor 56. In a number of variations, the one or more controllers 60 may include electronic processing components to receive input signals from various sensors 96, 98, 100, 102 which may relay various conditions of the motor 56 and the crankshaft 38. The one or more controllers 60 may include memory, a processor, and/or software or hardware to process the signals to estimate the amount of inertial and spin losses from the electric powertrain 68 and/or may perform a pedal effort transformation to process a pedaling effort into a DC frame of reference so that compensation may be treated on an average basis. The controller(s) 60 may generate an output signal or command 150, 162 based on the estimated torque loss and the pedal effort and may send the output signal or command 150, 162 to the motor 56 and a corresponding torque may be applied to the motor 56, if required, which may compensate for the inertial and spin losses from the electric powertrain 68 so that a rider of the electric cycle 20 may pedal the electric cycle 20 with a natural feel and without the feeling of having to pedal through the additional force of the inertial and spin losses of the electric powertrain 68. In a number of variations, the controller(s) 60 may be part of or may be a general purpose or specific purpose computer.

FIG. 2 illustrates a general arrangement for an electric cycle powertrain 68 according to a number of variations. The general arrangement of the electric powertrain 68 of FIG. 2 is used for illustrative purposes only and it is noted that any number of electric powertrains comprising any variations of motors and gear sets may include an inertial and spin loss compensation system 58.

In a number of variations, the electric cycle powertrain 68 may include a motor 56 and at least one gear set 76 which may be operatively attached to the motor 56 and a chain ring 48. In one variation, the at least one gear set 76 may comprise a planetary gear set which may include a sun gear 78 which may be operatively attached to one or more planetary gears 83 so that when the sun gear 78 may be rotated, the sun gear 78 causes the one or more planetary gears 83 to rotate within a ring gear 82 which may be grounded. In a number of variations, the one or more planetary gears 83 may be operatively connected to a carrier 84 and may cause the carrier to rotate when the one or more planetary gears 83 may be rotated. A crank 38 may be operatively connected to the chain ring 48 and a first and second pedal assembly 40, 44. The chain ring 48 may be attached to a chain 50 operatively connected to a rear sprocket 52 operatively connected to a rear hub 54 to drive a rear wheel 55. A first sensor 96 may be operatively attached to the stator 70 of the motor 56 and may be constructed and arranged to detect the temperature of the motor 56. A second sensor 98 may be attached to a grounded element 82 of the at least one gear set 76 including, but not limited to, the ring gear 82, and may be constructed and arranged to detect the temperature of the at least one gear set 76. A third sensor 100 may be operatively attached to a sun gear 78 of the at least one gear set 76 and may be constructed and arranged to detect the motor 56 position, speed, and cadence. A fourth sensor 102 may be used to measure the torque, speed, and direction of rotation of the crank 38. The fourth sensor 102 may be operatively attached to any number of locations including, but not limited to, attached to a tube 104 operatively connected to the crankshaft 38 (as illustrated in FIG. 2) so that the distortion of the tube 104 may be measured and is indicative of the torque, speed and direction of rotation of the crankshaft 38. In another variation, the fourth sensor 102 may be operatively connected to a gear set and may be used to measure the reaction torque from the pedal input. In another variation, the fourth sensor 102 may be operatively connected to the crankshaft 38 and may be used to measure the reaction torque from the crankshaft 38.

In a number of variations, the sensors 96, 98, 100, 102 may be operatively attached to the one or more controllers 60 and may provide output signals of various measurements to the one or more controllers 60 so that the controller(s) 60 may process the data to estimate the inertia and spin losses of the powertrain 68 and may be used to determine the pedal input.

Figure 4:
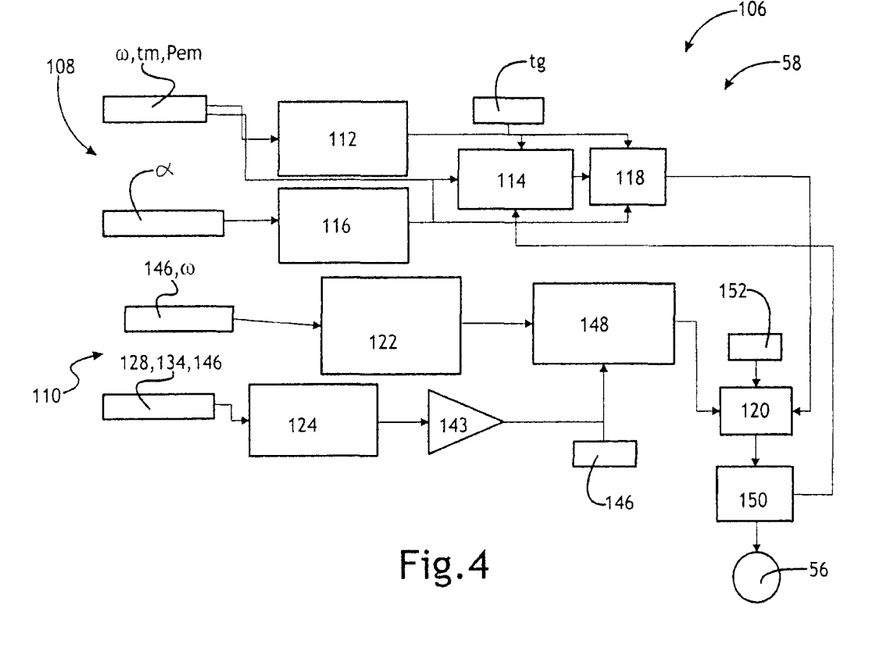
FIG. 4 illustrates a control chart for an inertial and spin loss compensation system according to a number of variations.

FIG. 4 illustrates a variation of a control chart 106 for an inertial and spin loss compensation system 58 which may be used to determine the inertia and spin loss 108 of the electric powertrain 68 and to perform a pedal input interpretation 110.

In a number of variations, the inertia and spin loss compensation 108 required may be determined by finding the sum of at least one of the electric motor 56 spin loss torque $T_{em}$, the loaded gear 76 loss torque $T_g$, and the electric motor 56/gear set 76 inertial torque $T_i$.

Figure 6:
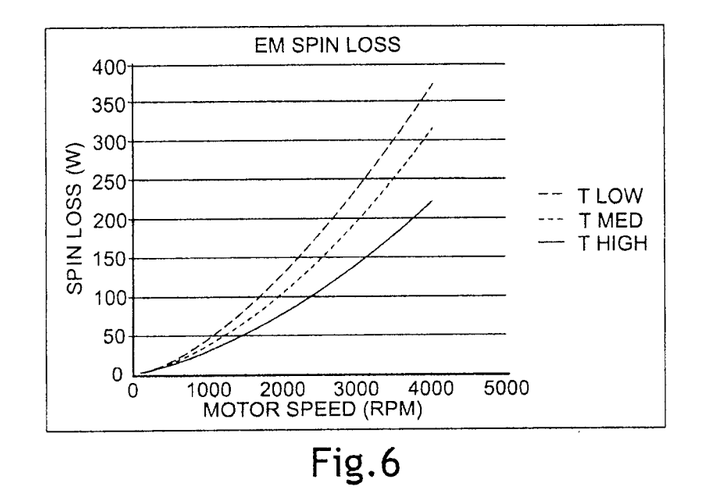
FIG. 6 illustrates a power versus speed curve according to a number of variations.

The electric motor spin loss torque $T_{em}$ may be determined in any number of variations at a first step 112. In one variation, the at least one sensor 96, 98, 100, 102 and at least one controller 60 may be used to determine the motor angular speed ω, motor loss $P_{em}$, and motor temperature $t_{em}$ which may be input into a lookup table which may determine the estimated torque loss $T_{em}$. Referring to FIG. 6, in another variation, the motor loss $P_{em}$, the motor temperature $t_{em}$, and the motor angular speed ω may be input into a power versus speed curve, to determine the motor spin loss torque $T_{em}$. As illustrated in FIG. 6, the motor spin loss torque $T_{em}$ may increase as the temperature decreases. In another variation, the at least one sensor 96, 98, 100, 102 and at least one controller 60 may determine the motor spin loss torque $T_{em}$ by determining the motor angular speed ω and the motor loss $P_{em}$ and inputting the motor angular speed ω and the motor loss $P_{em}$ into the formula $P_{em}=T_{em}*\omega$ where $T_{em}=P_{em}/\omega$.

At the same time, the loaded gear loss torque $T_g$ (which may also include bearing torque loss) may be determined in a second step 114. This may be done in a number of variations. In one variation, the at least one sensor 96, 98, 100, 102 and the at least one controller 60 may be used to determine the motor angular speed ω, the motor loss $P_{em}$, the motor temperature $t_{em}$, and gear temperature $t_g$ and may input the motor angular speed ω, the motor loss $P_{em}$, the motor temperature $t_{em}$, and gear temperature $t_g$ into the following equation, $P_g=P_r+P_s+P_p+P_d$, to determine the power of the gears $P_g$, wherein $P_r$=rolling friction (function of torque), sliding friction (function of torque), $P_s$=viscous drag (function of speed), $P_p$=pumping loss (function of speed), and $P_d$=Friction losses (free spin losses). The torque of the gears $T_g$ may then be calculated using the formula $T_g=P_g/\omega$.

At the same time, the at least one sensor 96, 98, 100, 102 and the at least one controller 60 may determine the motor acceleration a which may be input into a third step 116 which may estimate the motor inertial torque $T_i$. The at least one controller 60 may calculate the motor inertial torque $T_i$ using the formula $T_i=I*\alpha$, wherein I=the system inertia and α=the angular acceleration. The system inertia I may be equal to the angular momentum L over the motor angular speed ω.

In a number of variations, a fourth step 118 may take the torque sum $T_{loss}$ of the estimated electric motor spin loss torque $T_{em}$, the estimate of the loaded gear loss torque $T_g$, and the estimate of the motor inertial torque $T_i$, i.e. $T_{loss}=T_{em}+T_i+T_g$. The torque sum $T_{loss}$ may then be sent to a fifth step 120 so that a torque command 150 may be determined, as will be discussed hereafter.

In a number of variations, a pedal input interpretation 110 may be performed. In one variation, the at least one sensor 96, 98, 100, 102 and the at least one controller 60 may determine the cadence 146 and the motor speed ω which may be input into a sixth step 122 to determine whether the motor 56 and the pedal assemblies 40, 44 are engaged synchronously through the one or more gear sets 76. This may be done by multiplying the cadence 146 by the gear ratio to determine whether it is equal to the motor speed ω± a predetermined number.

A seventh step 124 may perform pedal effort transformation. Pedal effort transformation may be used to transform the measured input torque (periodic signal) to the crank and/or effort frame of reference to a non-periodic measurement or steady state DC signal. In one variation, the at least one sensor 96, 98, 100, 102 may detect a position of the crank 38 and the pedal torque at that position. Based on these measurements, a periodic wave of the torque may be generated based on the torque versus position of the crank 38 relationship (torque may be at maximum when the position of the crank 38 is at 90 degrees from top dead center (TDC) and may be at a minimum when the position of the crank 38 is at TDC and bottom dead center (BDC). In one variation, the periodic wave may be a periodic function including, but not limited to, a sinusoidal curve. In another variation, non-sinusoidal and speed dependency curves may be used and may be treated with either Fourier series expansion or a lookup table as will be discussed below.

Figure 7:
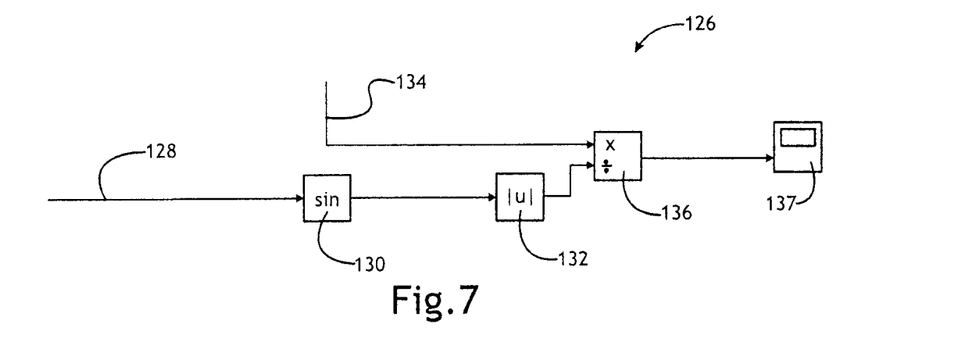
FIG. 7 illustrates a control algorithm according to a number of variations.

Referring to FIG. 7, in a number of variations, a controller 60 may include a control algorithm 126 which may input the periodic wave into block 130 and may transform the periodic wave to a non-periodic measurement. In one variation, the periodic wave may be a sine wave (or cosine wave). The sine wave may then be assigned an absolute value 132. The absolute value 132 of the sine wave, and the crankshaft torque measurement 134 may then be sent to a divide block 136 which may divide the crankshaft torque measurement 134 by the absolute value 132 of the sine wave. This value and the crankshaft torque measurement 134 may then be used to determine the non-periodic pedal effort torque $T_{trans}$ measurement at the Scope2 block 137.

In another variation, a periodic but non-sinusoidal wave may be used and may be treated with Fourier series expansion which may take the periodic but non-sinusoidal wave and may decompose it into the sum of oscillating sines and cosines. The summation may be in the form of the following function:

$$s_N(x) = \frac{a_0}{2} + \sum_{n=1}^{N}\left(\frac{A_n sin(\phi_n)}{a_n}\cos\left(\frac{2\pi nx}{P}\right) + \frac{A_n cos(\phi_n)}{b_n}\sin\left(\frac{2\pi nx}{P}\right)\right)$$

The summation found using the Fourier series expansion may then be input into block 130 in the above control algorithm 126. An absolute value 132 may then be assigned to the summation. The absolute value 132 of the summation and the crankshaft torque measurement 134 may then be sent to the divide block 136 which may divide the crankshaft torque measurement 134 by the absolute value 132 of the summation. This value and the crankshaft torque measurement 134 may then be used to determine the non-periodic pedal effort torque $T_{trans}$ measurement at the Scope2 block 137.

Figure 9:
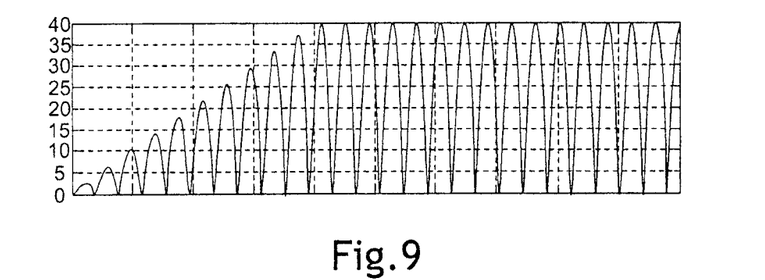
FIG. 9 illustrates a torque versus time curve according to a number of variations.
Figure 10:
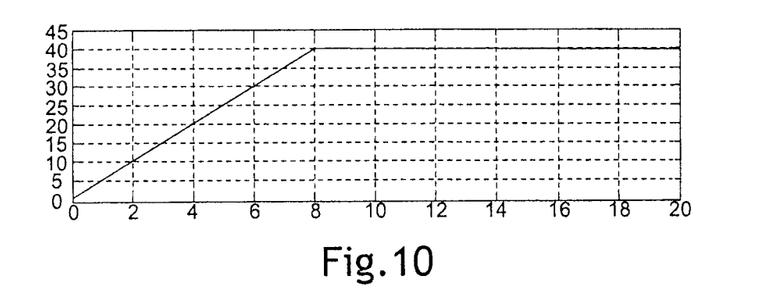
FIG. 10 illustrates a calculated amplitude of a torque signal after a pedal effort transformation according to a number of variations.

In a number of variations, the pedal effort transformation may allow for the amplitude of the periodic in position torque value to be calculated using the known torque versus crank position relationship at any instance in time which may convert the AC signal to a DC signal. This may allow a torque command to be generated or changed instantaneously. FIG. 9 illustrates a torque versus time curve wherein the torque signal has been ramped to a constant torque. FIG. 10 illustrates the calculated amplitude of the torque signal after a pedal effort transformation.

Figure 8:
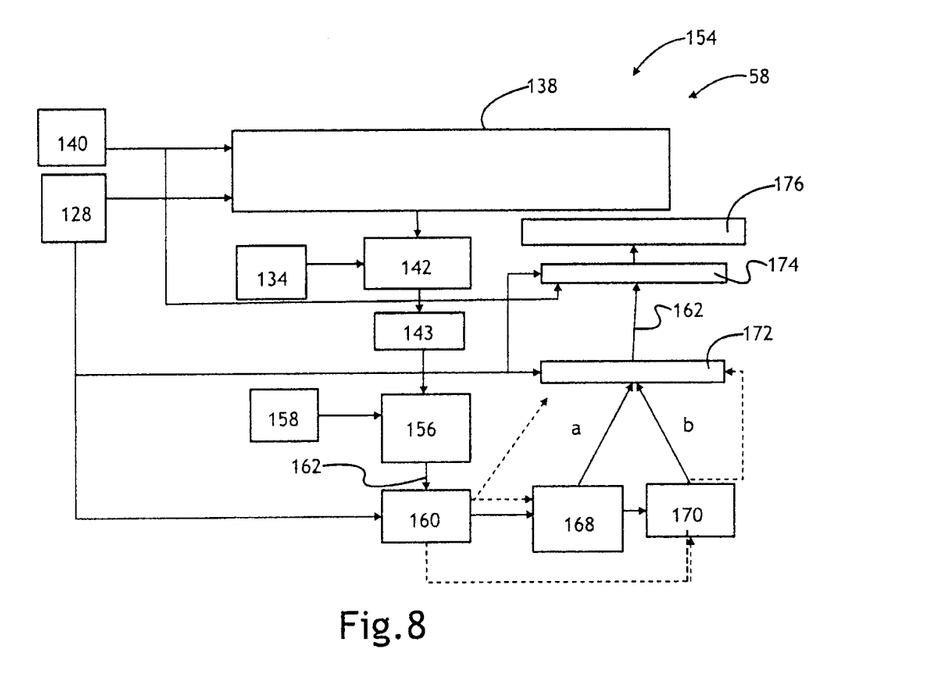
FIG. 8 illustrates a control chart for an inertial and spin loss compensation system using a lookup table according to a number of variations.

Referring to FIG. 8, in another variation, pedal effort transformation may be done through a transformation coefficient lookup table 138. In a number of variations, the at least one controller 60 may input the crank speed 140 and the crank position 128 into a transformation coefficient lookup table 138 to determine the transformation coefficient. The transformation coefficient value and the crank torque 134 may then be input into an eighth step 142 which may multiply the transformation coefficient by the crank torque 134.

Referring again to FIG. 4, in a number of variations, a ninth step 143 may apply a gain to the pedal effort torque $T_{trans}$, so that $T_{avg}=T_{trans}$*gain, wherein the gain=1/sqrt(2).

In a number of variations, a tenth step 148 may take the pedal effort torque with applied gain $T_{avg}$, the output from step six 122 of whether the motor 56 and the pedal assemblies 40, 44 are engaged synchronously through the one or more gear sets 76, and the cadence 146, and may determine whether the pedal effort transformation $T_{avg}$ is greater than a predetermined value (dependent on cadence) and if the cadence 146 multiplied by the gear ratio is equal to the motor speed+/−a predetermined value. If YES, then a torque command 150 may be sent to the motor 56. The apply torque $T_{apply}$ may then be calculated at a fifth step 120 based on the mode 152 of the electric cycle 20 and the torque sum $T_{loss}$ from the fourth step 118, where $T_{apply}=T_{loss}+T_{avg}$*function (Mode). In a number of variations, various operating modes 152 of the electric cycle 20 may be assigned various functions. Chart 1 below illustrates a variation of a Mode chart.

CHART 1

| Mode | Function(Mode) |
|---|---|
| A | 0 |
| B | 1 |
| C | 2 |
| ... | ... |

Figure 11:
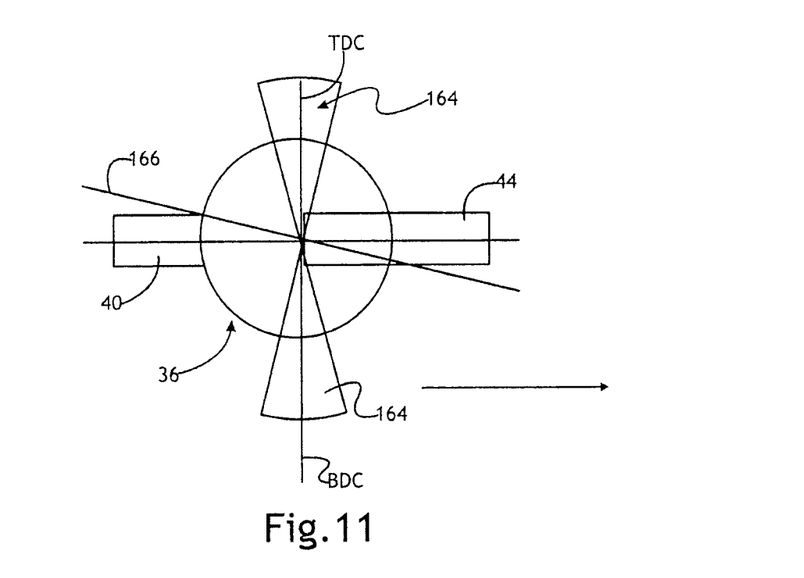
FIG. 11 illustrates a schematic of pedal positions according to a number of variations.

FIG. 8 illustrates a control chart 154 for a pedal effort transformation using a transformation coefficient lookup table 138 as discussed above. In this variation, the pedal effort torque $T_{trans}$ found in step nine 143 may be sent to step eleven 156 along with a user assist level or mode 158 to determine a torque command 162 which may be sent to the motor 56 to apply a torque $T_{apply}$ to the motor 56. The torque command 162 may be sent to a twelfth step 160 which may take an input signal of the crank position 128 to determine whether the crank position 128 is within a predetermined gray zone 164, a variation of which is illustrated in FIG. 11. The gray zone 164 may include the area where one of the pedal assemblies 40, 44 may be at TDC or 0 degrees and the angles near 0 degrees and where the other pedal assembly 40, 44 is at or near BDC or 180 degrees and the angles near 180 degrees where power may be at a minimum. Dividing by sine (theta) in the gray zone 164 may produce significant numerical error, i.e. it may be close to dividing by zero. The maximum power point 166 may be out of the gray zone and may be when one of the pedal assemblies 40, 44 is at approximately 100 degrees.

If the crank position 128 is not in the gray zone 164 then the position may be stored at step thirteen 168 as a previous non-gray zone point. If the crank position 128 is in the gray zone 164 then step fourteen 170 may use the stored non-gray zone point in step thirteen 168. Step fifteen 172 may then send the torque command 162 to step sixteen 174 to determine whether the crank position 128 is in the gray zone 164 or not. In a number of variations, step sixteen 174 may determine whether a torque command 162 will be sent to the motor 56 at step seventeen 176 by first determining whether the crank position 128 is in the gray zone 164 and if the crank speed 140 is less than a predetermined speed, if YES, then the torque command 162 to the motor 56 is zero and no torque may be applied to the motor 56. If step fifteen 172 determines that one of the pedal assemblies 40, 44 is in the gray zone 164 and the speed is greater than a predetermine value, then the torque calculated for the torque command 162 sent to step seventeen 176 must be less than the previous non-gray zone torque from step thirteen 168 in order to modify the torque command sent to 176 (this means while in the gray zone, the torque command will not increase, only decrease if the calculated torque is less than the previous non gray zone point torque). If the crank position 128 is not in the gray zone 164 and the crank speed 140 is greater than the predetermined speed, then the torque command 162 may be sent to the motor 56 so that torque may be applied to the motor 56 to compensate for inertial and spin losses of the powertrain 68 along with propulsion torque determined by user selected mode and pedal effort.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: an electric cycle powertrain comprising: a motor; at least one gear set operatively connected to the motor; a chain ring operatively connected to the at least one gear set and a chain; a rear sprocket operatively connected to the chain ring and a rear hub; a crank operatively connected to the chain ring and a first pedal assembly and a second pedal assembly; and at least one controller and at least one sensor, wherein the at least one controller is constructed and arranged to process one or more signals from the at least one sensor to apply a torque to the motor to compensate for inertial and spin loss associated with the electric cycle powertrain.

Variation 2 may include a product as set forth in Variation 1 wherein the inertial and spin losses associated with the electric cycle powertrain are based on an estimate of the inertial and spin losses associated with the electric cycle powertrain and a pedal input interpretation.

Variation 3 may include a product as set forth in any of Variations 1-2 wherein the at least one sensor measures various operating conditions of the motor and a crank and provides outputs of the various operating conditions to the controller.

Variation 4 may include a product as set forth in any of Variations 1-3 wherein the at least one sensor and the at least one controller determines at least one of a speed of the motor, a temperature of the motor, an acceleration of the motor, a cadence, a position of the crank, or a torque of the crank.

Variation 5 may include a product as set forth in any of Variations 1-4 wherein the at least one controller comprises at least one of a control algorithm, a lookup table, or a signal processing technique to calculate a torque command based on at least one of the various operating conditions.

Variation 6 may include a method to compensate for inertial and spin losses associated with an electric cycle powertrain comprising: using at least one sensor and a controller to estimate inertial and spin losses of an electric cycle powertrain and a pedal effort torque, and multiplying the pedal effort torque by a gain to get a torque average; using the controller to determine a torque command to compensate for the inertial and the spin losses of the electric cycle powertrain using the estimate of the inertial and the spin losses of the electric cycle powertrain and the torque average; and applying the torque command to the motor using the controller.

Variation 7 may include a method as set forth in Variation 6 wherein determining the torque command further comprises adding the estimate of the inertial and the spin losses of the electric cycle powertrain with the torque average and multiplying by a function of a mode of the electric cycle.

Variation 8 may include a method as set forth in any of Variations 6-7 wherein estimating the inertial and spin losses of the electric cycle powertrain comprises: using the at least one sensor and the controller to estimate a first spin loss torque of the motor, a second spin loss torque of the at least one gear set, and an inertial torque of the motor and the at least one gear set, and summing the first spin loss torque of the motor, the second spin loss torque of the at least one gear set, and the inertial torque of the motor and the at least one gear set.

Variation 9 may include a method as set forth in Variation 8 wherein estimating the first spin loss torque of the motor comprises using the at least one sensor and the controller to determine an angular speed of the motor, a power of the motor, and a temperature of the motor, and inputting the angular speed of the motor, the power of the motor, and the temperature of the motor into a lookup table.

Variation 10 may include a method as set forth in Variation 8 wherein estimating the first spin loss torque of the motor comprises using the at least one sensor and the controller to determine a power of the motor and an angular speed of the motor and inputting the power of the motor and the angular speed of the motor into a power versus speed curve.

Variation 11 may include a method as set forth in Variation 8 wherein estimating the first spin loss torque of the motor comprises using the at least one sensor and the controller to determine a power of the motor and an angular speed of the motor, and dividing the power of the motor by the angular speed of the motor.

Variation 12 may include a method as set forth in any of Variations 8-11 wherein estimating the second spin loss torque of the at least one gear set comprises using the at least one sensor and the controller to determine a power of the at least one gear set and an angular speed of the motor and dividing the power of the at least one gear set by the angular speed of the motor.

Variation 13 may include a method as set forth in any of Variations 8-12 wherein estimating the inertial torque of the motor and the at least one gear set comprises using the at least one sensor and the controller to determine a system inertia and an angular acceleration of the motor, and multiplying the system inertia by the angular acceleration of the motor.

Variation 14 may include a method as set forth in any of Variations 6-13 wherein the pedal effort torque is determined by: using the at least one sensor and the controller to determine a periodic input torque to the crank, a cadence, and a speed of the motor; using the controller to transform the periodic input torque to the crank into a non-periodic pedal effort torque; applying a gain to the non-periodic pedal effort torque with the controller; using the controller to determine whether the speed of the motor and the cadence are approximately the same; using the controller to determine whether the non-periodic pedal effort torque with the gain is greater than the cadence, if the cadence and the speed of the motor are approximately the same; using the controller to calculate a torque command to apply to the motor based on a mode, if the non-periodic pedal effort torque is greater than the cadence; and using the controller to apply the torque command to the motor.

Variation 15 may include a method as set forth in Variation 14 wherein transforming the periodic input torque to the crank into the non-periodic pedal effort torque comprises: using the at least one sensor and the controller to determine a position of the crank and a torque measurement of the crank; using the controller to determine a sinusoidal wave of a pedal effort torque based on the relationship between the position of the crank and the torque measurement; assigning an absolute value of the sinusoidal wave; and using the controller to determine the non-periodic pedal effort torque by dividing the torque measurement of the crank by the absolute valve of the sinusoidal wave of the pedal effort torque.

Variation 16 may include a method as set forth in Variation 14 wherein transforming the periodic input torque to the crank into the non-periodic pedal effort torque comprises: using the at least one sensor and the controller to determine a position of the crank and a torque measurement of the crank; using the controller to determine a periodic but non-sinusoidal wave based on the relationship of the position of the crank, and the torque measurement of the crank; treating the non-sinusoidal wave with a Fourier series expansion to decompose the non-sinusoidal wave into a sum of oscillating sines and cosines, and assigning an absolute value to the sum of oscillating sines and cosines; and using the controller to determine the non-periodic pedal effort torque by dividing the torque measurement of the crank by the absolute valve of the sum of oscillating sines and cosines.

Variation 17 may include a method as set forth in Variation 14 wherein transforming the periodic input torque to the crank into the non-periodic effort torque comprises: using the at least one sensor and the controller to determine a speed of the crank, a position of the crank, and a torque of the crank; using the controller to determine a transformation coefficient by inputting the speed of the crank and the position of the crank into a lookup table; and using the controller to determine the non-periodic pedal effort torque by multiplying the transformation coefficient by the torque of the crank.

Variation 18 may include a method to compensate for inertial and spin losses associated with an electric cycle powertrain comprising: using at least one sensor and a controller to determine a speed of a motor, a power of the motor, a first temperature of the motor, a second temperature of at least one gear set, an acceleration of the motor, a system inertia, a position of a crankshaft, a cadence, a torque of the crankshaft, a periodic pedal input, and a gear ratio; using the controller to estimate a spin loss torque of the motor using the speed of the motor, the power of the motor, and the first temperature of the motor; using the controller to estimate a loaded gear loss torque using the speed of the motor, the power of the motor, the first temperature of the motor, and the second temperature of the at least one gear set; using the controller to estimate an inertial torque of the motor and the at least one gear set using the acceleration of the motor and the system inertia; using the controller comprising summing the spin loss torque of the motor, the loaded gear loss torque, and the inertial torque of the motor and the at least one gear set; using the controller to transform the periodic pedal input into a non-periodic pedal effort using at least one of the position of the crankshaft, the cadence, or the torque of the crankshaft; applying a gain to the non-periodic pedal effort to determine an average torque using the controller; using the controller to determine whether the cadence multiplied by the gear ratio is approximately equal to the speed of the motor; using the controller to determine whether the non-periodic pedal effort is greater than the cadence if the cadence multiplied by the gear ratio is approximately equal to the speed of the motor; using the controller to determine a torque command based on the spin loss torque of the motor, the loaded gear loss torque, and the inertial torque of the motor and the at least one gear set, if the non-periodic pedal effort is greater than the cadence; and using the controller to send the torque command to the motor.

Variation 19 may include a method to compensate for inertial and spin losses of an electric cycle powertrain comprising: using at least one sensor and a controller to determine a position of a crank and a torque of the crank; using the controller to determine a periodic function based on a relationship of the position of the crank and the torque of the crank; assigning an absolute value to the periodic function using the controller; using the controller to determine a non-periodic pedal effort torque by dividing the torque of the crank by the absolute value of the periodic function; using the controller to determine a torque command using the non-periodic pedal effort torque; and using the controller to apply the torque command to a motor to compensate for inertial and spin losses of the electric cycle.

Variation 20 may include a method as set forth in Variation 19 wherein the periodic function is a sinusoidal wave.

Variation 21 may include a method as set forth in Variation 19 wherein the periodic function is a non-sinusoidal wave treated with Fourier series expansion.

Variation 22 may include a method to compensate for inertial and spin losses associated with an electric cycle powertrain comprising: using at least one sensor and a controller to determine a position of a crank, a speed of the crank, and a torque of the crank; using the controller to determine a transformation coefficient by inputting the position of the crank and the speed of the crank into a transformation coefficient lookup table; and using the controller to determine a non-periodic pedal effort by multiplying the transformation coefficient by the torque of the crank.

Variation 23 may include a method as set forth in Variation 22 further comprising: using the controller to determine a torque command to be sent to a motor by multiplying a user assist level by the non-periodic pedal effort; using the at least one sensor and the controller to determine whether the position of the crank is in a predetermined gray zone; and if the position of the crank is in the predetermined gray zone and if the speed of the crank is less than a predetermined speed, then the controller does not send the torque command to the motor, and if the position of the crank is not in the predetermined gray zone and the speed of the crank is greater than the predetermined speed, then using the controller to send the torque command to the motor.

Variation 24 may include a method as set forth in Variation 23 wherein if the controller determines the position of the crank is in the predetermined gray zone and the speed of the crank is greater than the predetermined speed, then the torque command calculated cannot be greater than a previous non-gray zone torque calculated.

Variation 25 may include a method as set forth in any of Variations 23-24 wherein the predetermined gray zone is where a first pedal assembly is positioned at approximately zero degrees top dead center and a second pedal assembly is at approximately 180 degrees bottom dead center.

The above description of select variations within the scope of the invention is merely illustrative in nature and, thus, variations or variants thereof are not to be regarded as a departure from the spirit and scope of the invention.

What is claimed is:

1. A product comprising:
an electric cycle powertrain comprising:
a motor;
at least one gear set operatively connected to the motor;
a chain ring operatively connected to the at least one gear set and a chain;
a rear sprocket operatively connected to the chain and a rear hub;
a crank operatively connected to the chain ring and a first pedal assembly and a second pedal assembly; and
at least one controller and at least one sensor, wherein the at least one controller is constructed and arranged to process one or more signals from the at least one sensor to estimate a first spin loss torque of the motor, a second spin loss torque of the at least one gear set, and an inertial torque of the motor and the at least one gear set, and summing the first spin loss torque of the motor, the second spin loss torque of the at least one gear set, and the inertial torque of the motor and the at least one gear set to apply a torque to the motor to compensate for the first spin loss torque of the motor, the second spin loss torque of the at least one gear set, and the inertial torque of the motor and the at least one gear set.

2. The product of claim 1 wherein the at least one sensor and the at least one controller are constructed and arranged to determine a periodic input torque to the crank, a cadence, and a speed of the motor; wherein the at least one controller is constructed and arranged to transform the periodic input torque to the crank into a non-periodic pedal effort torque, to apply a gain to the non-periodic pedal effort torque, to determine whether the speed of the motor and the cadence are approximately the same, to determine whether the non-periodic pedal effort torque with the gain is greater than the cadence, if the cadence and the speed of the motor are approximately the same; to calculate a torque command to apply to the motor based on a mode, if the non-periodic pedal effort torque is greater than the cadence; and to send the torque command to the motor.

3. The product of claim 1 wherein the at least one sensor measures at least one operating condition of the motor and at least one operating condition of the crank and provides outputs of the at least one operating condition of the motor and the at least one operating condition of the crank to the controller.

4. The product of claim 3 wherein the at least one controller comprises at least one of a control algorithm, a lookup table, or a signal processing technique to calculate a torque command based on the at least one operating conditions.

5. A method to compensate for inertial associated with an electric cycle powertrain comprising:
using at least one sensor and a controller to estimate at least one inertial and spin loss of an electric cycle powertrain comprising using the at least one sensor and the controller to estimate a first spin loss torque of the motor, a second spin loss torque of the at least one gear set, and an inertial torque of the motor and the at least one gear set, and summing the first spin loss torque of the motor, the second spin loss torque, of the at least one gear set, and the inertial torque of the motor and the at least one gear set and a pedal effort torque, and multiplying the pedal effort torque by a gain to get a torque average;

using the controller to determine a torque command to compensate for the at least one inertial and the spin losses of the electric cycle powertrain using the estimate of the at least one inertial and the spin losses of the electric cycle powertrain and the torque average; and
applying the torque command to the motor using the controller.

6. The method of claim 5 wherein determining the torque command further comprises adding the estimate of the at least one inertial and the spin loss of the electric cycle powertrain with the torque average and multiplying by a function of a mode of the electric cycle.

7. The method of claim 5 wherein estimating the first spin loss torque of the motor comprises using the at least one sensor and the controller to determine an angular speed of the motor, a power of the motor, and a temperature of the motor, and inputting the angular speed of the motor, the power of the motor, and the temperature of the motor into a lookup table.

8. The method of claim 5 wherein estimating the first spin loss torque of the motor comprises using the at least one sensor and the controller to determine a spin loss power of the motor and an angular speed of the motor and inputting the spin loss power of the motor and the angular speed of the motor into a power loss versus speed curve.

9. The method of claim 5 wherein estimating the first spin loss torque of the motor comprises using the at least one sensor and the controller to determine a power of the motor and an angular speed of the motor, and dividing the power of the motor by the angular speed of the motor.

10. The method of claim 5 wherein estimating the second spin loss torque of the at least one gear set comprises using the at least one sensor and the controller to determine a power of the at least one gear set and an angular speed of the motor and dividing the power of the at least one gear set by the angular speed of the motor.

11. The method of claim 5 wherein estimating the inertial torque of the motor and the at least one gear set comprises using the at least one sensor and the controller to determine a system inertia of the motor and the at least one gear set and an angular acceleration of the motor, and multiplying the system inertia of the motor and the at least one gear set by the angular acceleration of the motor.

12. The method of claim 5 wherein the pedal effort torque is determined by:
using the at least one sensor and the controller to determine a periodic input torque to the crank, a cadence, and a speed of the motor;
using the controller to transform the periodic input torque to the crank into a non-periodic pedal effort torque;
applying a gain to the non-periodic pedal effort torque with the controller;
using the controller to determine whether the speed of the motor and the cadence are approximately the same;
using the controller to determine whether the non-periodic pedal effort torque with the gain is greater than the cadence, if the cadence and the speed of the motor are approximately the same;
using the controller to calculate a torque command to apply to the motor based on a mode, if the non-periodic pedal effort torque is greater than the cadence; and
using the controller to send the torque command to the motor.

13. The method of claim 12 wherein transforming the periodic input torque to the crank into the non-periodic pedal effort torque comprises:

using the at least one sensor and the controller to determine a position of the crank and a torque measurement of the crank;
using the controller to determine a sinusoidal wave of a pedal effort torque based on the relationship between the position of the crank and the torque measurement; assigning an absolute value of the sinusoidal wave; and
using the controller to determine the non-periodic pedal effort torque by dividing the torque measurement of the crank by the absolute value of the sinusoidal wave of the pedal effort torque.

14. The method of claim 12 wherein transforming the periodic input torque to the crank into the non-periodic pedal effort torque comprises:
using the at least one sensor and the controller to determine a position of the crank and a torque measurement of the crank;
using the controller to determine a periodic but non-sinusoidal wave based on the relationship of the position of the crank, and the torque measurement of the crank; treating the non-sinusoidal wave with a Fourier series expansion to decompose the non-sinusoidal wave into a sum of oscillating sines and cosines, and assigning an absolute value to the sum of oscillating sines and cosines; and
using the controller to determine the non-periodic pedal effort torque by dividing the torque measurement of the crank by the absolute valve of the sum of oscillating sines and cosines.

15. The method of claim 12 wherein transforming the periodic input torque to the crank into the non-periodic effort torque comprises:
using the at least one sensor and the controller to determine a speed of the crank, a position of the crank, and a torque of the crank;
using the controller to determine a transformation coefficient by inputting the speed of the crank and the position of the crank into a lookup table; and
using the controller to determine the non-periodic pedal effort torque by multiplying the transformation coefficient by the torque of the crank.

16. A method to compensate for inertial associated with an electric cycle powertrain comprising:
using at least one sensor and a controller to determine a speed of a motor, a power of the motor, a first temperature of the motor, a second temperature of at least one gear set, an acceleration of the motor, a rotational inertia of the motor and the at least one gear set, a position of a crankshaft, a cadence, a torque of the crankshaft, a periodic pedal input, and a gear ratio;
using the controller to estimate a spin loss torque of the motor using the speed of the motor, the power of the motor, and the first temperature of the motor;
using the controller to estimate a loaded gear loss torque using the speed of the motor, the power of the motor, the first temperature of the motor, and the second temperature of the at least one gear set;
using the controller to estimate an inertial torque of the motor and the at least one gear set using the acceleration of the motor and the motor and at least one gear set system inertia;
using the controller comprising summing the spin loss torque of the motor, the loaded gear loss torque, and the inertial torque of the motor and the at least one gear set;
using the controller to transform the periodic pedal input into a non-periodic pedal effort using at least one of the position of the crankshaft, the cadence, or the torque of the crankshaft;
applying a gain to the non-periodic pedal effort to determine an average torque using the controller;
using the controller to determine whether the cadence multiplied by the gear ratio is approximately equal to the speed of the motor;
using the controller to determine whether the non-periodic pedal effort is greater than the cadence if the cadence multiplied by the gear ratio is approximately equal to the speed of the motor;
using the controller to determine a torque command based on the spin loss torque of the motor, the loaded gear loss torque, and the inertial torque of the motor and the at least one gear set, if the non-periodic pedal effort is greater than the cadence; and
using the controller to send the torque command to the motor.

17. A method to compensate for inertial and spin losses of an electric cycle powertrain comprising:
using at least one sensor and a controller to determine a position of a crank and a torque of the crank at the position;
inputting the position of the crank and the torque of the crank at the position into the controller and using the controller to generate a periodic function of the torque based on a torque versus position of the crank relationship;
assigning an absolute value to the periodic function using the controller;
using the controller to determine a non-periodic pedal effort torque by dividing the torque of the crank by the absolute value of the periodic function;
using the controller to determine a torque command using the non-periodic pedal effort torque; and
using the controller to apply the torque command to a motor of the electric cycle powertrain.

18. The method of claim 17 wherein the periodic function is a sinusoidal wave.

19. The method of claim 17 wherein the periodic function is a non-sinusoidal wave and the controller decomposes the sum of oscillating sines and cosines using a Fourier series expansion equation.

\* \* \* \* \*